US012018566B2

(12) United States Patent
Imamura et al.

(10) Patent No.: US 12,018,566 B2
(45) Date of Patent: Jun. 25, 2024

(54) BEARING DEVICE FOR RADIAL PISTON MACHINE

(71) Applicant: DAIDO METAL COMPANY LTD., Nagoya (JP)

(72) Inventors: Akiyoshi Imamura, Inuyama (JP); Yu Suzuki, Inuyama (JP); Marina Oguri, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 267 days.

(21) Appl. No.: 17/483,869

(22) Filed: Sep. 24, 2021

(65) Prior Publication Data

US 2022/0098982 A1 Mar. 31, 2022

(30) Foreign Application Priority Data

Sep. 28, 2020 (JP) ................................ 2020-161595

(51) Int. Cl.
*F01B 13/06* (2006.01)
*F01B 1/06* (2006.01)
*F02B 57/10* (2006.01)

(52) U.S. Cl.
CPC .......... *F01B 13/061* (2013.01); *F01B 1/0644* (2013.01); *F01B 1/0651* (2013.01); *F02B 57/10* (2013.01)

(58) Field of Classification Search
CPC .... F01B 13/061; F01B 1/0644; F01B 1/0651; F02B 57/10
See application file for complete search history.

(56) References Cited

U.S. PATENT DOCUMENTS 5,145,264 A 9/1992 Bryden et al.
2021/0285429 A1* 9/2021 Albert .................. F01B 13/061

FOREIGN PATENT DOCUMENTS

CN 106460512 A * 2/2017 ........... F04B 1/0439
DE 102014203571 A1 8/2015

(Continued)

OTHER PUBLICATIONS

Machine Translation of CN 106460512 A PDF File Name: "CN106460512A_Machine_Translation.pdf".*

(Continued)

*Primary Examiner* — Grant Moubry
*Assistant Examiner* — Ruben Picon-Feliciano
(74) *Attorney, Agent, or Firm* — Harness, Dickey & Pierce, P.L.C.

(57) ABSTRACT

A bearing device includes a piston arranged in a cylinder of a rotor, and a half bearing mounted on the piston to support a roller. The piston includes a recessed holding surface, and holding side surfaces on both axial sides thereof. Each holding side surface includes a ridge portion having an arc-shaped or elliptic-arc-shaped profile protruding toward a radially inner side of the piston. The half bearing includes a partially cylindrical portion, and protruding portions protruding from axial end faces thereof. Each protruding portion has a protruding portion end face which includes a central recessed surface, and two support recessed surfaces located on both circumferential sides thereof, that have an arc shape or an elliptic arc shape to correspond to the profile of the ridge portion, so that only the two support recessed surfaces are in contact with the ridge portion.

5 Claims, 8 Drawing Sheets

(56) References Cited

FOREIGN PATENT DOCUMENTS

| | | | |
|---|---|---|---|
| DE | 102012207088 | B4 | 11/2021 |
| EP | 3472465 | B1 | 8/2020 |
| JP | S62-58064 | A | 3/1987 |
| JP | 2008-196410 | A | 8/2008 |
| JP | 2009-531596 | A | 9/2009 |
| JP | 2012-122498 | A | 6/2012 |
| WO | WO-2007/113443 | A1 | 10/2007 |
| WO | WO-2009031027 | A1 | 3/2009 |
| WO | WO-2016/097230 | A1 | 6/2016 |
| WO | WO-2017/100555 | A1 | 6/2017 |

OTHER PUBLICATIONS

Office Action dated May 10, 2022 issued in German Patent Application No. 10 2021 124 687.3 with translation.

* cited by examiner

BEARING DEVICE FOR RADIAL PISTON MACHINE

BACKGROUND OF THE INVENTION

(1) Field of the Invention

The present invention relates to a bearing device for a radial piston machine such as a radial piston motor or a radial piston pump.

(2) Description of Related Art

As a conventional radial piston machine, a hydraulic radial piston motor described in JP 2008-196410 A is known. This hydraulic radial piston motor includes a cam ring having an approximately waveform cam face on its inner circumference, in which cam ring a rotor (cylinder block) is arranged, and an output shaft is coupled to the rotor. A plurality of radially extending cylinders are arranged in line in a circumferential direction in the rotor, and each of the cylinders has a cylinder port with which the cylinder communicates. One piston is arranged in each of the cylinders so as to be able to reciprocate therein, and the piston holds a roller which rolls on the cam face of the cam ring. The roller has a cylindrical shape, and is supported by a semi-cylindrical (partially cylindrical) bearing mounted on the piston so that the axis of the cylindrical shape is parallel to the rotational axis of the rotor.

The roller rolls along the cam face while a plurality of pistons reciprocate, whereby the rotor rotates about the rotational axis, so that rotational driving force can be obtained from an output shaft.

Further, the piston has a semi-cylindrical (partially cylindrical) bearing holding surface, on which the semi-cylindrical (partially cylindrical) bearing is mounted (see JP 2008-196410 A). As a half bearing, a bearing composed of a steel back metal layer and a slide layer is used (see JP 2012-122498 A, for example).

Both circumferential end faces of the half bearing are constrained by step surfaces which are formed on both circumferential sides of the bearing holding surface of the piston so as to protrude radially inward, so that the half bearing does not rotate in the bearing holding surface of the piston when supporting the roller (see FIGS. 1 and 2 of JP 2009-531596 A, FIG. 3 of JP S62-058064 A, etc.).

It is also proposed to provide rectangular recessed portions on both axial sides of the bearing holding surface of the piston, and provide rectangular projecting portions, which is adapted to the recessed portions, on both axial sides of the half bearing, so that the recessed portions engage the projecting portions when the half bearing is mounted on the bearing holding surface of the piston, thereby preventing rotation of the half bearing in the bearing holding surface of the piston (see FIGS. 3c, 4b, and 4c of WO 2016/097230 A).

BRIEF SUMMARY OF THE INVENTION

In the case of the conventional bearing devices (JP 2008-196410 A, JP 2012-122498 A, JP 2009-531596 A, JP S62-058064 A) in which both circumferential end faces of the half bearing are constrained by a constraining means such as the step surface of the piston, slight sliding occurs between an outer circumferential surface (surface of the back metal layer made of an Fe alloy) of the half bearing and a bearing holding surface of the piston during operation, and therefore fretting damage tends to be caused on the outer circumferential surface of the half bearing.

Further, in the case of the conventional bearing device (WO 2016/097230 A) in which rectangular recessed portions are provided on both axial sides of the bearing holding surface of the piston, and rectangular projecting portions adapted to the recessed portions are provided on both axial sides of the half bearing, so that the recessed portions engage the projecting portions, the projecting portions provided in the half bearing are deformed as to rise on an inner circumferential surface side of the half bearing during operation. Therefore, the surfaces of the projecting portions strongly contact with the surface of the roller, and damage tends to be caused.

Accordingly, an object of the present invention is to provide a bearing device for a radial piston machine, which does not easily cause damage resulting from fretting between an outer circumferential surface of a half bearing supporting a roller and a bearing holding surface of a piston, or damage resulting from deformation of the half bearing.

In order to achieve the above object, the present invention provides a bearing device for a radial piston machine, comprising:

- a cam ring having a cam face on a radially inner side thereof;
- a rotor rotatably supported in the cam ring and having a plurality of cylinders formed radially with respect to a rotational axis of the rotor;
- a cylindrical piston arranged slidably in the cylinder;
- a cylindrical roller arranged at an axial end of the piston on a cam ring side, a rotational axis of the roller being arranged parallel to the rotational axis of the rotor so that the roller rolls on the cam face; and
- a half bearing arranged between the piston and the roller, the half bearing being composed of a slide layer forming an inner circumferential surface for supporting the roller and a steel back metal layer forming an outer circumferential surface held by the piston, wherein:

the piston comprises, at the axial end on the cam ring side, a recessed holding surface of partial cylindrical shape for holding the half bearing, and holding side surfaces formed on both axial sides of the recessed holding surface;

each holding side surface comprises: a ridge portion extending in a radial direction of the recessed holding surface and an axial direction of the piston, and having an arc-shaped or elliptic-arc-shaped profile in a cross section perpendicular to the axial direction of the piston so as to protrude toward a radially inner side of the piston; and side surface portions expanding on both sides of the ridge portion in a circumferential direction of the piston;

the half bearing comprises: a partially cylindrical portion of partially cylindrical shape circumferentially extending between both circumferential end faces of the half bearing, the partially cylindrical portion having the same axial length as those of the circumferential end faces over the entire circumferential direction of the half bearing, and thereby defining axial end faces on both axial sides thereof that extend in a plane perpendicular to the axial direction of the half bearing; and a protruding portion extending toward an axially outer side from each of the axial end faces of the partially cylindrical portion, and formed over the entire circumferential direction of the half bearing integrally with the partially cylindrical portion;

each of the protruding portions comprises a protruding portion end face facing toward the axially outer side; and the protruding portion end face comprises: a central recessed surface located at a circumferential center of the half bearing and recessed toward an axially inner side of the half bearing; two support recessed surfaces located on both circumferential sides of the central recessed surface and each formed into an arc shape or an elliptic arc shape so as to correspond to the profile of the ridge portion; and two tilted surfaces located on both circumferentially outer sides of the two support recessed surfaces and extending up to the circumferential end faces, the two tilted surfaces being formed so that an axial protrusion amount of each of the tilted surfaces from the axial end face becomes smaller from a support recessed surface side toward a circumferential end face side, so that only the two support recessed surfaces of the protruding portion end face are in contact with the ridge portion of the piston while the central recessed surface and the tilted surfaces are not in contact with any of the ridge portion and the side surface portion.

In one embodiment of the present invention, the two support recessed surfaces and the central recessed surface may have, as a whole, a circumferential length corresponding to an angle of circumference of 40 to 70° of the half bearing.

Further, in one embodiment of the present invention, the central recessed surface may have a circumferential length which is 25 to 75% of the circumferential length of the two support recessed surfaces and the central recessed surface as a whole.

Still further, in one embodiment of the present invention, the protruding portion end face may further have a parallel surface between the tilted surface and the support recessed surface, that has a constant axial protrusion amount from the axial end face.

Still further, in one embodiment of the present invention, a bearing wall thickness in the protruding portion of the half bearing may be smaller than a bearing wall thickness in the partially cylindrical portion.

DESCRIPTION OF THE EMBODIMENTS

Hereinafter, embodiments of the invention of the present application will be described with reference to the drawings.

Embodiment 1

Figure 1:
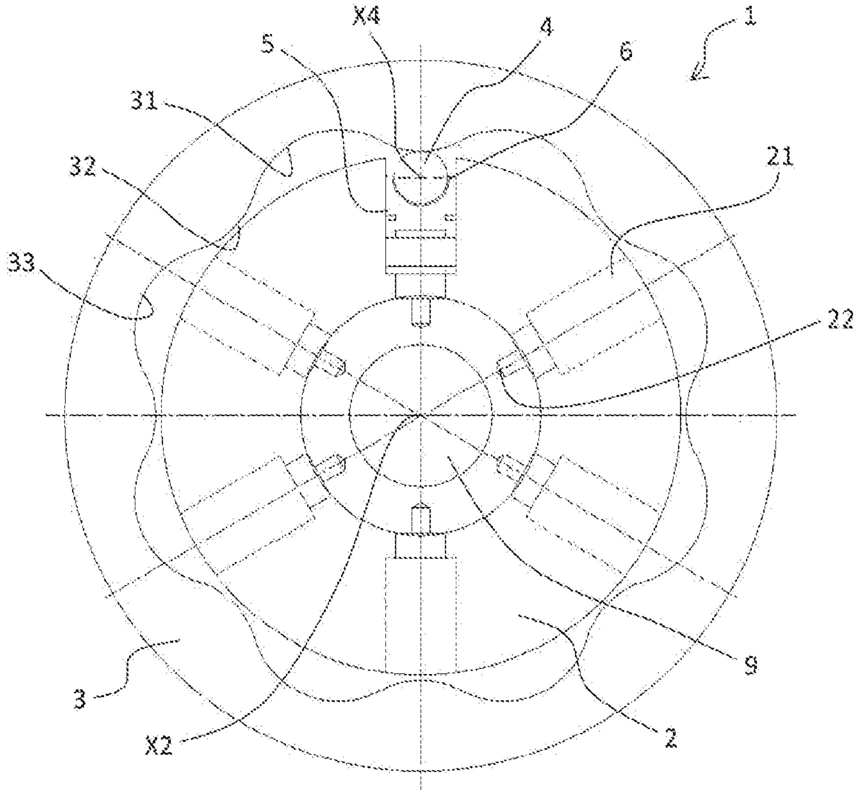
FIG. 1 is a partial sectional view in which a bearing device is seen from the front.

FIG. 1 illustrates a hydraulic radial piston motor as one example of a bearing device 1 for a radial piston machine. The bearing device 1 of the hydraulic radial piston motor has a cam ring 3 in which an approximately waveform cam face 31 is formed on an inner circumference, a rotor (cylinder block) 2 is arranged in the cam ring 3, and an output shaft 9 is further coupled to the rotor 2.

The cam face 31 of the cam ring 3 has eight cam lobes 32 arranged circumferentially at equal intervals (equal pitch) as illustrated in FIG. 1.

The rotor 2 has six cylinders 21 arranged circumferentially at equal intervals (equal pitch) as illustrated in FIG. 1, each extending radially, and having the same diameter. Each cylinder 21 communicates with a cylinder port 22.

One piston 5 is fitted into each of the six cylinders 21 so as to be able to reciprocate therein, and the piston 5 holds, via a half bearing 6, a roller 4 which rolls on the cam face 31 of the cam ring 3. The roller 4 has a cylindrical shape, and is held by the piston 5 in such a way that an axis X4 of the roller 4 is parallel to a rotational axis X2 of the rotor 2. A plurality of the pistons 5 reciprocate, and the roller 4 rolls along the cam face 31, whereby the rotor 2 rotates about the rotational axis X2, and thereby rotational driving force from the output shaft 9 can be obtained.

(Explanation of Piston)

Figure 2:
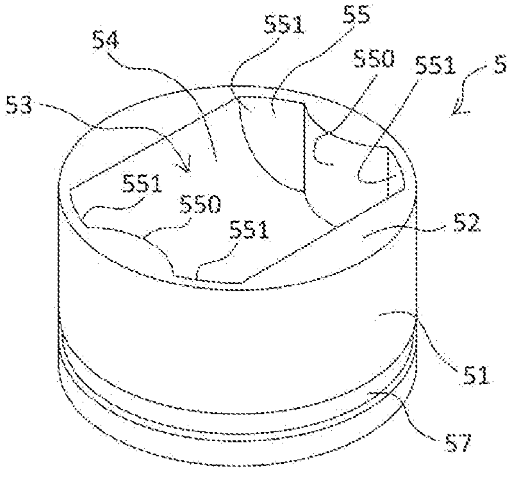
FIG. 2 is a perspective view illustrating a piston as a whole.

The pistons 5 is formed into a substantially cylindrical shape as illustrated in FIG. 2, and includes a circular outer circumferential surface 51, and an axial outer end face 52 located at an axial end facing toward a cam ring side.

Further, a circumferential groove 57 for attachment of a non-illustrated piston ring is formed in the outer circumferential surface 51 of the piston 5.

An opening 53 for receiving the roller 4 via the half bearing 6 is formed in the axial outer end face 52 of the piston 5. Specifically, the opening 53 includes a recessed holding surface 54 formed into a corresponding partially cylindrical shape in order to hold the partially cylindrical half bearing 6 described later, and holding side surfaces 55 formed on both axial sides of the recessed holding surface 54. The axis of the recessed holding surface 54 is set to be orthogonal to the axial direction of the piston 5.

In the present embodiment, the circumferential length of the recessed holding surface 54 is set to a length corresponding to an angle of circumference of 180°. However, the circumferential length of the recessed holding surface 54 is not limited to thereto, and may be set to a length corresponding to an angle of circumference of 120° at the minimum, and an angle of circumference of 220° at the maximum.

Specifically, each of the holding side surfaces 55 includes a ridge portion 550 which extends parallel to the axial direction of the piston 5 at a position corresponding to a circumferential center of the recessed holding surface 54, has an arc-shaped section perpendicular to the axial direction of the piston 5, and thereby protrudes toward a radially inner side of the piston 5, and side surface portions 551 which extend on both sides of the ridge portion 550 in the circumferential direction of the piston 5, and are formed to have a constant wall thickness up to the outer circumferential surface 51 of the piston 5. It should be noted that the arc shape in the section of the ridge portion 550 does not mean a geometrically strict arc, and may be an elliptic arc or a substantially arc shape.

Further, the ridge portion 550 is formed over the full length of each of the holding side surfaces 55 in the axial direction of the piston 5 in the present embodiment, but is not limited thereto, and the length of the ridge portion 550 from the recessed holding surface 54 may be smaller than the full length of the holding side surfaces 55.

Still further, the width of the ridge portion 550 in the circumferential direction of the piston 5 is constant over the axial direction of the piston 5 in the present embodiment, but is not limited thereto, and may change along the axial direction of the piston 5.

Still further, the ridge line of the ridge portion 550 is formed to extend parallel to the axial direction of the piston 5 in the present embodiment, but is not limited thereto, and may be formed to be slightly tilted (2° or less) relative to the axial direction of the piston 5, that is, toward the radially outer side of the piston 5.

Still further, the surface of each of the side surface portions 551 is also formed to extend parallel to the axial direction of the piston 5 in the present embodiment, but is not limited thereto, and each of the side surface portions 551 may be formed to be slightly tilted (2° or less) relative to the axial direction of the piston 5, that is, toward the radially outer side of the piston 5.

Still further, the wall thickness between each of the side surface portions 551 and the outer circumferential surface 51 of the piston 5 is constant over the circumferential direction of the piston 5 in the present embodiment, but may be maximal at a position adjacent to the ridge portion 550 and decrease in the circumferential direction toward a position connecting to the recessed holding surface 54.

(Explanation of Half Bearing)

Figure 3:
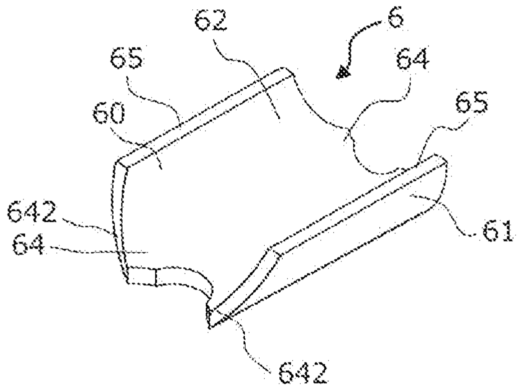
FIG. 3 is a perspective view illustrating a half bearing as a whole.
Figure 4:
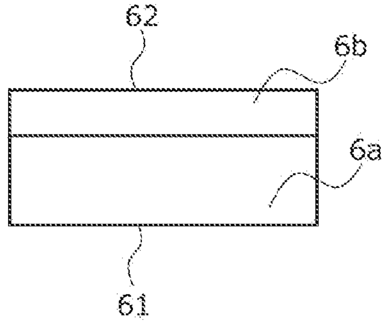
FIG. 4 is a sectional view illustrating the half bearing.
Figure 5:
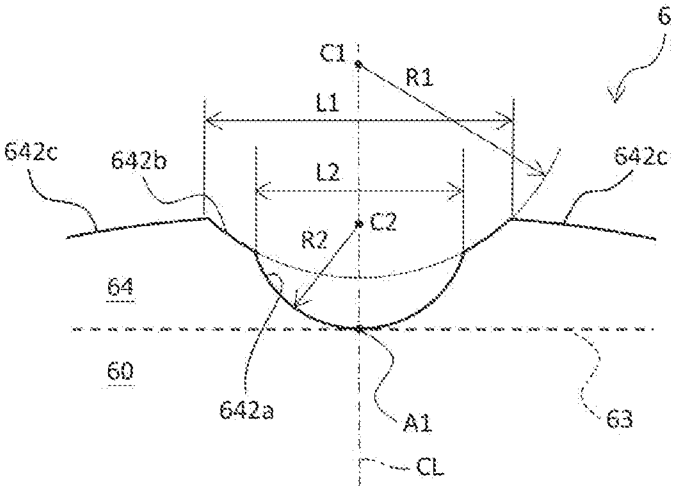
FIG. 5 is an enlarged view of a protruding portion of the half bearing.

Next, the configuration of the half bearing 6 is described by use of FIGS. 3 to 5. The half bearing 6 according to the present embodiment is formed by a bimetal (see FIG. 4) in which a thin slide layer 6*b* is bonded to a steel back metal layer 6*a* to have a partially cylindrical shape in which the steel back metal layer 6*a* is arranged on an outer circumferential surface 61 side, and the slide layer 6*b* is arranged on an inner circumferential surface 62 side.

Hypoeutectoid steel or stainless steel with a carbon content of 0.05 to 0.25 percent by mass can be used as the steel back metal layer 6*a*. As the slide layer 6*b*, a composition can be used which mainly contains one or more kinds of synthetic resins selected from the group consisting of PEEK (polyether ether ketone), polytetrafluoroethylene (PTFE), polyimide (PI), and polyamide-imide (PAI), and which includes a solid lubricant such as graphite $MoS_2$, $WS_2$, or h-BN, carbon fiber or metal compound fiber which increases the strength of the slide layer, and a filler such as $CaF_2$, $CaCo_3$, barium sulfate, iron oxide, calcium phosphate, or $SnO_2$. Moreover, a porous sintered portion of a copper alloy or the like may be provided on the surface of the steel back metal layer 6*a* in order to improve the joining of the steel back metal layer 6*a* and the slide layer 6*b*.

The half bearing 6 according to the present embodiment has a partially cylindrical portion 60 having a partially cylindrical shape circumferentially extending between both circumferential end faces 65, 65, and the partially cylindrical portion 60 has the same axial length as the axial length of the circumferential end face 65 over the entire circumferential direction of the half bearing 6, and therefore define, on both axial sides thereof, (virtual) axial end faces 63, 63 extending in a plane perpendicular to the axial direction of the half bearing 6 (FIG. 5). In the present embodiment, the partially cylindrical portion 60 is formed in such a way as to have a circumferential length corresponding to an angle of circumference of 180°. However, the circumferential length of the partially cylindrical portion 60 is not limited thereto, and may be set to a length corresponding to an angle of circumference of 120° at the minimum, and an angle of circumference of 220° at the maximum.

As illustrated in FIGS. 3 and 5, the half bearing 6 further includes, over the entire circumferential direction thereof, a protruding portion 64 extending toward the axially outer side from each of the axial end faces 63 of the partially cylindrical portion 60. Each protruding portion 64 includes, on the axially outer side thereof, a protruding portion end face 642 extending over the entire circumferential direction. Specifically, the protruding portion end face 642 includes an arc-shaped central recessed surface 642*a* located at the circumferential center of the half bearing 6 and deeply recessed toward the axially inner side of the half bearing 6, two support recessed portions 642*b*, on both circumferential sides of the central recessed surface 642*a*, that each have part of a sectional arc shape corresponding to the sectional arc shape of the ridge portion 550 of the piston 5, and that are therefore recessed toward the axially inner side of the half bearing 6, and two tilted surfaces 642*c*, 642*c* which are located further on both circumferential sides of the two support recessed surfaces 642*b*, 642*b* and extend up to the circumferential end faces 65, and the two tilted surfaces 642*c*, 642*c* are formed in such a way that an axial protrusion amount (axial distance) of each of the tilted surfaces 642*c* from each of the (virtual) axial end faces 63 becomes small toward the circumferential end face 65 side from the support recessed surface 642*b*, 642*b* side.

A common center C1 of the arcs of the two support recessed portions 642*b* and a center C2 of the arc of the central recessed surface 642*a* are located on a line which passes a circumferential center CL of the half bearing 6 and is parallel to the axis of the half bearing 6.

A most recessed part (deepest point) A1 of the central recessed surface 642*a* is located preferably in the same plane as each of the (virtual) axial end faces 63 of the partially cylindrical portion 60, but the deepest point A1 may be located on the axially outer side relative to each of the axial end faces 63.

A radius R2 of the arc of the central recessed surface 642*a* is smaller than a radius R1 of the arc of each of the support recessed portions 642*b*.

It should be noted that each of the arc shapes of each of the support recessed portions 642*b* and the central recessed surface 642*a* may not be a geometrically strict arc, and may be an approximate arc shape.

The two support recessed surfaces 642*b*, 642*b* and the central recessed surface 642*a* have a circumferential length L1, as a whole, along the circumferential direction of the half bearing 6, and the circumferential length L1 is preferably a length corresponding to an angle of circumference of 40 to 70° of the half bearing 6 (on the outer circumferential surface 61).

Moreover, the central recessed surface 642*a* alone has a circumferential length L2 along the circumferential direction of the half bearing 6 (on the outer circumferential surface 61), and the circumferential length L2 is preferably 25 to 75% of the circumferential length L1 of the two support recessed surfaces 642*b*, 642*b* and the central recessed surface 642*a* (on the outer circumferential surface 61) as a whole.

It should be noted that the circumferential length L1 of the two support recessed surfaces 642*b*, 642*b* and the central recessed surface 642*a* as a whole, and the circumferential length L2 of the central recessed surface 642*a* are constant in the radial direction of the half bearing 6 in the present embodiment, but may be configured to decrease from the outer circumferential surface 61 side toward the inner circumferential surface 62 side when the half bearing 6 is formed by bending a bimetal, for example.

Figure 6:
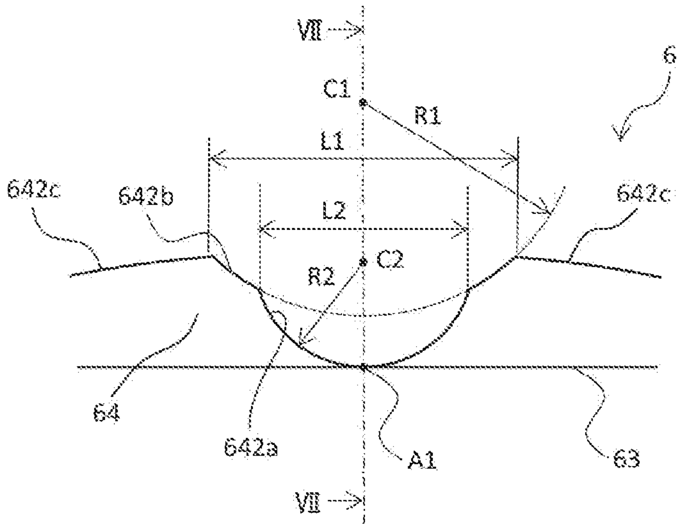
FIG. 6 is an enlarged view of the protruding portion of the half bearing.
Figure 7:
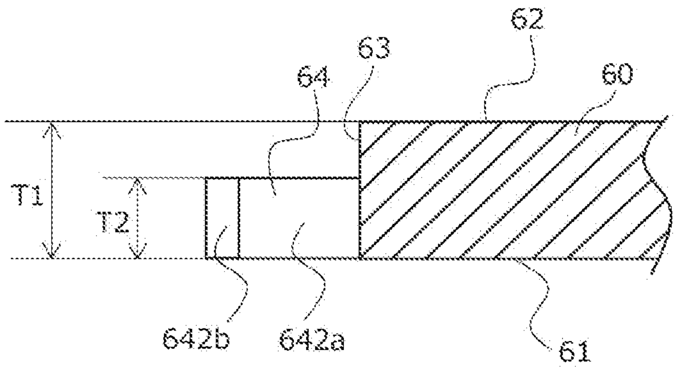
FIG. 7 is a view illustrating a section along line VII-VII in FIG. 6.

Further, the bearing wall thickness of the protruding portion 64 of the half bearing 6 is the same as the bearing wall thickness of the partially cylindrical portion 60 of the half bearing 6 in the present embodiment, but a bearing wall thickness T2 of the protruding portion 64 may be smaller than a bearing wall thickness T1 of the partially cylindrical portion 60 (see FIGS. 6 and 7).

(Attachment of Half Bearing to Piston)

Figure 8A:
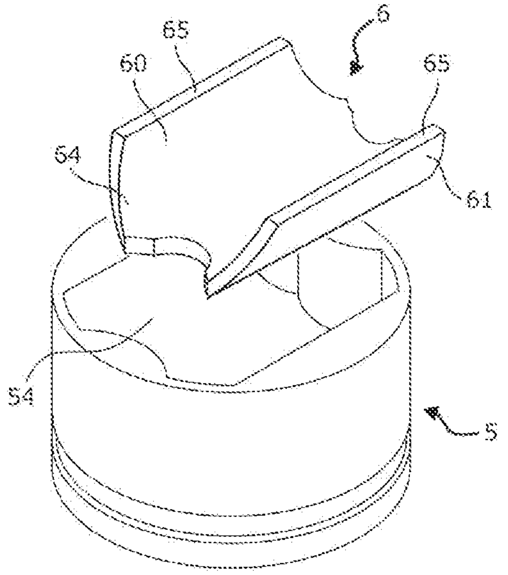
FIG. 8A is a perspective view illustrating the piston and the half bearing as a whole.
Figure 8B:
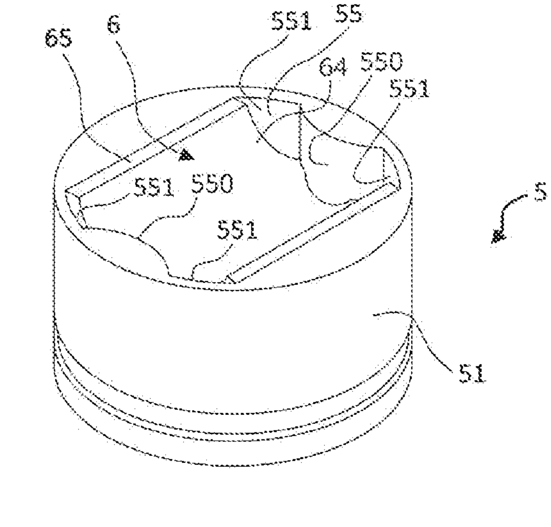
FIG. 8B is a perspective view illustrating the piston and the half bearing as a whole.
Figure 9:
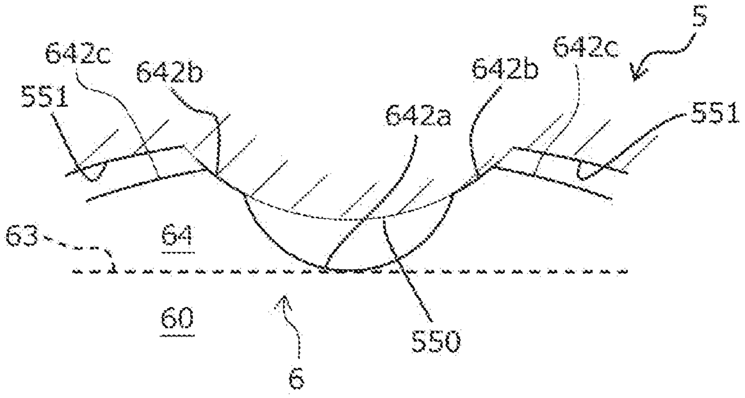
FIG. 9 is an enlarged view illustrating a contact between a protruding portion of the piston and a ridge portion of the half bearing illustrated in FIG. 8B.

FIG. 8A illustrates the half bearing 6 and the piston 5 before attachment. FIG. 8B illustrates a state where the half bearing 6 is attached to the piston 5. FIG. 9 illustrates, in an enlarged form, the contact between the ridge portion 550 of the piston 5 and the protruding portion 64 of the half bearing 6 in the state illustrated in FIG. 8B.

The half bearing 6 has the outer circumferential surface 61 in the partially cylindrical portion 60 attached and held to the recessed holding surface 54 formed in the piston 5. As illustrated, in this held state, circumferential end faces 65, 65 of the half bearing 6 are not in contact with the piston 5.

Meanwhile, according to the present invention, only the two support recessed portions 642*b* of the protruding portion 64 are adapted to be in contact with the piston 5, more specifically, the ridge portion 550 of the piston 5, and the central recessed surface 642*a* and the tilted surfaces 642*c* of the protruding portion 64 are not in contact with each of the holding side surfaces 55 of the piston 5.

(Action of Bearing Device)

Figure 10A:
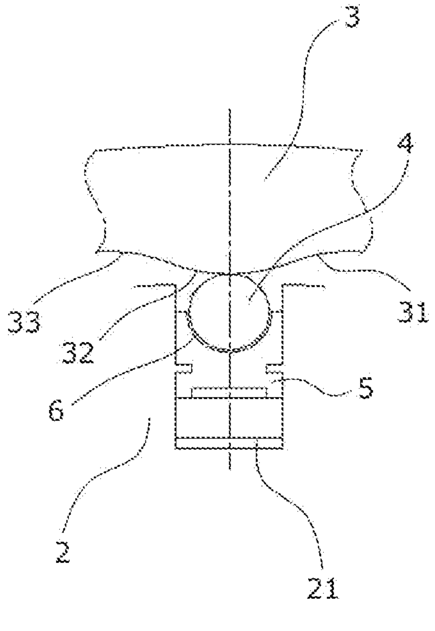
FIG. 10A is a view illustrating operation of a cam ring and a piston.
Figure 10B:
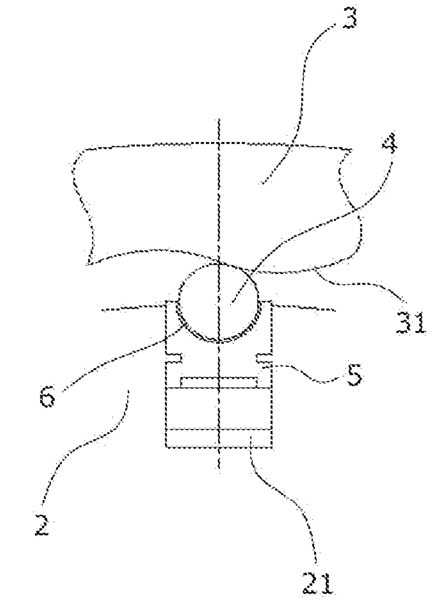
FIG. 10B is a view illustrating the operation of the cam ring and the piston.
Figure 10C:
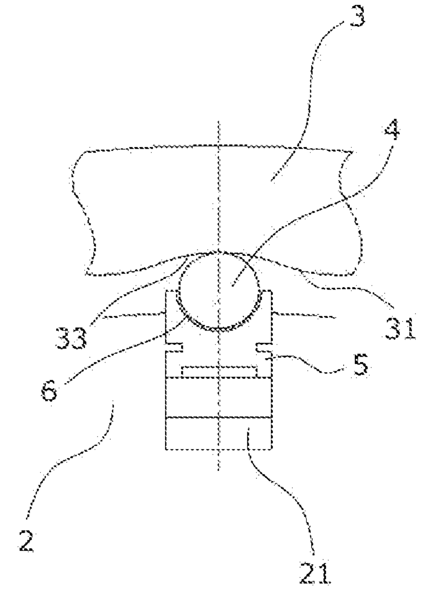
FIG. 10C is a view illustrating the operation of the cam ring and the piston.
Figure 10D:
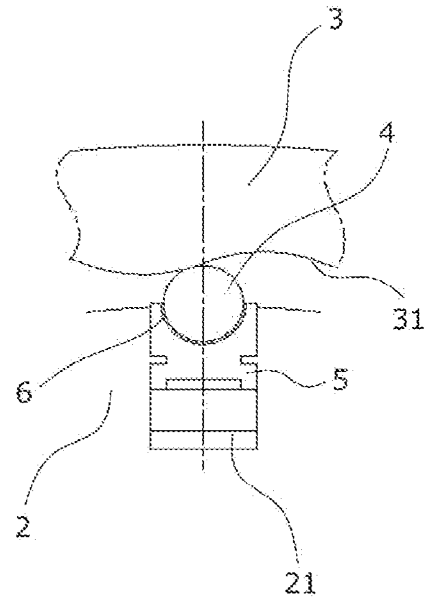
FIG. 10D is a view illustrating the operation of the cam ring and the piston.

FIGS. 10A to 10D illustrate the operations, in a cylinder 21, of the roller 4 rolling on the cam face 31 of the cam ring 3, and the rotor 2 of the piston 5. Particularly, FIG. 10A illustrates a state where the roller 4 is at the vertex of the cam lobe 32 of the cam face 31, and the piston 5 is at a bottom dead center, and FIG. 10C illustrates a state where the roller 4 is at the lowermost point of a cam bottom 33 of the cam face 31, and the piston 5 is at the top dead center.

The inner circumferential surface (slide surface) 62 of the half bearing 6 bears the outer circumferential surface of the roller 4 which rotates by rolling on the cam face 31. The load applied to the inner circumferential surface (slide surface) 62 of the half bearing 6 from the roller 4 always changes, is maximized when the piston 5 is at the bottom dead center, and is minimized when the piston 5 is at the top dead center. Moreover, the load from the roller 4 is mainly applied to the vicinity of the circumferential center of the half bearing 6.

Meanwhile, in a conventional bearing device (see JP 2008-196410 A, JP 2012-122498 A, JP 2009-531596 A, JP S62-058064 A), a circumferential end face of a half bearing is in contact with a constraining means (i.e., radially inwardly protruding step surfaces formed on both circumferential sides of a recessed holding surface of a piston) formed in the piston, whereby circumferential movement is restricted. Thus, while the piston moves from the bottom dead center to the top dead center (FIG. 10B), the half bearing is pressed to the circumferential end face side on a front side in the rotation direction of a roller by the rotating roller, and is elastically deformed in such a way that the circumferential length of the half bearing decreases. On the other hand, while the piston moves from the top dead center to the bottom dead center (FIG. 10D), the half bearing is deformed in such a way that the circumferential length of the half bearing increases (or returns to the original circumferential length).

When the half bearing is pressed to the circumferential end face side on the front side in the rotation direction of the roller as described above, the circumferential elastic deformation amount becomes large particularly in the vicinity of the circumferential center of the half bearing, and therefore reciprocating slip is repeated between the outer circumferential surface of the half bearing and the recessed holding surface of the piston.

If the reciprocating slip is repeated, the outer circumferential surface of a back metal layer made of an Fe alloy becomes high in temperature and is oxidized at the circumferential center of the half bearing, and abrasion powder ($Fe_2O_3$) dropping from the outer circumferential surface of the back metal layer is brought between the outer circumferential surface of the back metal layer of the half bearing and the recessed holding surface of the piston. Since the oxidized abrasion powder ($Fe_2O_3$) is harder than the Fe alloy of the back metal layer, further repetition of the reciprocating slip causes fretting damage due to the oxidized abrasion powder, and the outer circumferential surface of the back metal layer of the half bearing (particularly, the outer circumferential surface of the back metal layer in the vicinity of the circumferential center) and/or the recessed holding surface of the piston are damaged.

(Effects of the Present Invention)

In the half bearing 6 according to the present invention, only the two support recessed portions 642*b* of the protruding portion end face 642 of the protruding portion 64 are in contact with the ridge portion 550 of the piston 5, so that the circumferential movement of the half bearing 6 in the recessed holding surface 54 of the piston 5 is restricted. Since the circumferential movement of the half bearing 6 is restricted at the circumferential center thereof in this way, the circumferential elastic deformation amount of the half bearing 6 in the recessed holding surface 54 of the piston 5 (particularly, the circumferential elastic deformation amount of the half bearing 6 in the vicinity of the circumferential center) becomes small during operation of a radial piston machine. Therefore, reciprocating slip between the outer circumferential surface 61 of the half bearing 6 and the recessed holding surface 54 of the piston 5 becomes small, and fretting damage is prevented.

Further, as described above, the circumferential movement of the half bearing 6 in the recessed holding surface 54 of the piston 5 is restricted by the contact of the two support recessed portions 642*b* of the protruding portion 64 of the half bearing 6 with the ridge portion 550 of the piston 5.

However, since the contact surfaces are tilted relative to the direction (i.e., the circumferential direction) of the load applied to the half bearing 6 from the roller 4, part of the load applied to the protruding portion 64 is consumed by slip between the contact surfaces, and therefore the elastic deformation amount of the protruding portion 64 becomes small.

Moreover, the central recessed surface 642*a* formed between the two support recessed portions 642*b* of the protruding portion 64 of the half bearing 6 are not in contact with the ridge portion 550 of the piston 5, and the two tilted surfaces 642*c* of the protruding portion 64 are also adapted not to be in contact with the side surface portions 551 of the piston 5, so that a clearance is formed therebetween. Thus, the elastic deformation of the protruding portion 64 tends to occur toward the clearance when receiving the load from the roller 4, and therefore such elastic deformation that the protruding portion 64 is directed toward the radially inner side from the inner circumferential surface 62 of the half bearing 6 does not easily occur.

Figure 12:
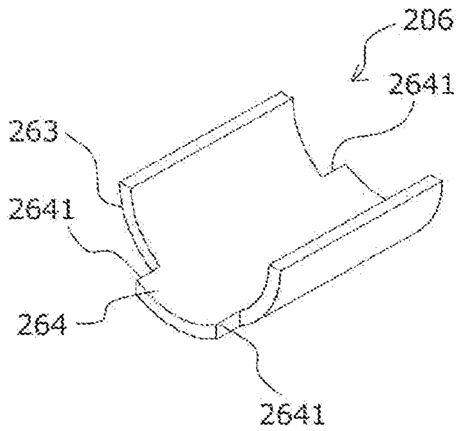
FIG. 12 is a perspective view illustrating a conventional half bearing as a whole.
Figure 13:
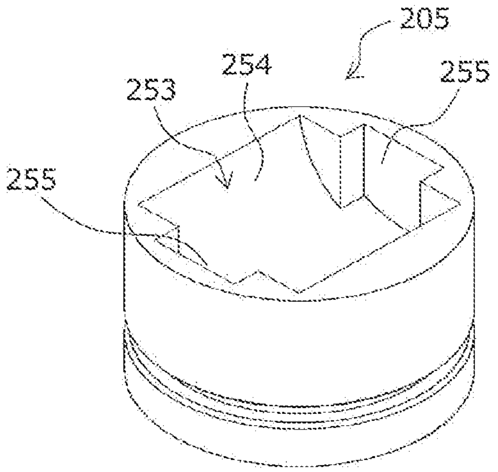
FIG. 13 is a perspective view illustrating a conventional piston as a whole.

It should be noted that in contrast to the embodiment, for example, as described in WO 2016/097230 A, in a conventional bearing device, rectangular protruding portions 264 perpendicularly protruding from axial end faces 263 are formed at both axial ends of a half bearing 206 (FIG. 12), rectangular recessed portions 255 corresponding to the protruding portions 264 are formed in an opening 253 of a piston 205 (FIG. 13), so that the protruding portions 264 are fitted into the recessed portions 255. In this case, circumferential side surfaces 2641 of the protruding portions 264 perpendicularly extending from axial end faces 263 of the half bearing 206 are in contact with the corresponding surfaces of the recessed portions 255 of the piston 205, and thereby the circumferential movement of the half bearing 206 in a recessed holding surface 254 of the piston 205 is constrained. However, since the contact surfaces are arranged orthogonally to the direction (i.e., the circumferential direction) of a load applied to the half bearing 206 from a roller, a great load is applied to the circumferential side surfaces 2641 of the protruding portions 264, and the protruding portions 264 are elastically deformed or plastically deformed so as to rise toward the radially inner side from the inner circumferential surface of the half bearing 206. Thus, the surfaces of the protruding portions 264 are strongly in contact with the surface of the roller, and damage tends to occur.

Embodiment 2

Figure 11:
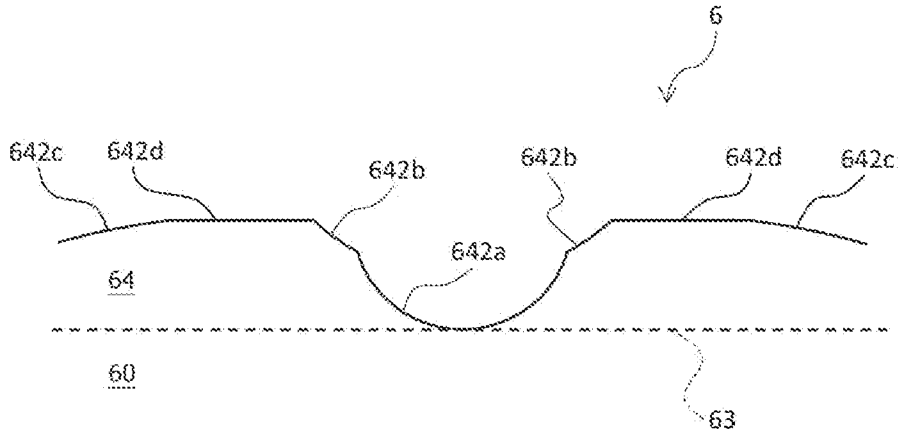
FIG. 11 is an enlarged view of a protruding portion according to Embodiment 2.

A half bearing 6 having a protruding portion 64 different from that according to Embodiment 1 is described below by use of FIG. 11. It should be noted that the same reference signs are assigned to components that are identical with or equivalent to those in the contents described in Embodiment 1.

(Configuration)

The overall configuration of a bearing device 1 according to the present embodiment is similar to that according to Embodiment 1. The configuration of the half bearing 6 is also approximately similar to that according to Embodiment 1 except for the shape of the protruding portion 64.

A protruding portion end face 642 facing toward the axially outer side of the protruding portion 64 of the half bearing 6 according to Embodiment 2 further includes, in addition to the central recessed surface 642*a* and the support recessed portions 642*b*, parallel surfaces 642*d*, 642*d* extending parallel to the circumferential direction of the half bearing 6, between the two support recessed portions 642*b* and the tilted surfaces 642*c*. The parallel surface 642*d*, 642*d* of the protruding portion 64 of the half bearing 6 are also adapted not to be in contact with the ridge portion 550 and the side surface portions 551 of the piston 5 when the half bearing 6 is attached to the piston 5. Moreover, each of the parallel surfaces 642*d* preferably has a circumferential length corresponding to an angle of circumference of 5 to 35° of the half bearing 6.

The bearing device 1 having the half bearing 6 according to Embodiment 2 has the same action as the bearing device 1 according to Embodiment 1.

While the hydraulic radial piston motor as one example of a bearing device for a radial piston machine has been presented in the embodiments, it will be appreciated that the bearing device according to the present invention is applicable also to a hydraulic radial piston pump and the like.

The invention claimed is:

1. A bearing device for a radial piston machine, comprising:

- a cam ring having a cam face on a radially inner side thereof;
- a rotor rotatably supported in the cam ring and having a plurality of cylinders formed radially with respect to a rotational axis of the rotor;
- a cylindrical piston arranged slidably in the cylinder;
- a cylindrical roller arranged at an axial end of the piston on a cam ring side, a rotational axis of the roller being arranged parallel to the rotational axis of the rotor so that the roller rolls on the cam face; and
- a half bearing arranged between the piston and the roller, the half bearing being composed of a slide layer forming an inner circumferential surface for supporting the roller and a steel back metal layer forming an outer circumferential surface held by the piston, wherein:
- the piston comprises, at the axial end on the cam ring side, a recessed holding surface of partial cylindrical shape for holding the half bearing, and holding side surfaces formed on both axial sides of the recessed holding surface;
- each holding side surface comprises:
  - a ridge portion extending in a radial direction of the recessed holding surface and an axial direction of the piston, and having an arc-shaped or elliptic-arc-shaped profile in a cross section perpendicular to the axial direction of the piston so as to protrude toward a radially inner side of the piston; and
  - side surface portions expanding on both sides of the ridge portion in a circumferential direction of the piston;
- the half bearing comprises:
  - a partially cylindrical portion of partially cylindrical shape circumferentially extending between both circumferential end faces of the half bearing, the partially cylindrical portion having the same axial length as those of the circumferential end faces over the entire circumferential direction of the half bearing, and thereby defining axial end faces on both axial sides thereof that extend in a plane perpendicular to the axial direction of the half bearing; and
  - a protruding portion extending toward an axially outer side from each of the axial end faces of the partially cylindrical portion, and formed over the entire circumferential direction of the half bearing integrally with the partially cylindrical portion;
- each of the protruding portions comprises a protruding portion end face facing toward the axially outer side;
- the protruding portion end face comprises:

a central recessed surface located at a circumferential center of the half bearing and recessed toward an axially inner side of the half bearing;

two support recessed surfaces located on both circumferential sides of the central recessed surface and each formed into an arc shape or an elliptic arc shape so as to correspond to the profile of the ridge portion; and two tilted surfaces located on both circumferentially outer sides of the two support recessed surfaces and extending up to the circumferential end faces, the two tilted surfaces being formed so that an axial protrusion amount of each of the tilted surfaces from the axial end face becomes smaller from a support recessed surface side toward a circumferential end face side, so that only the two support recessed surfaces of the protruding portion end face are in contact with the ridge portion of the piston while the central recessed surface and the tilted surfaces are not in contact with any of the ridge portion and the side surface portion; and the two support recessed surfaces and the central recessed surface have, as a whole, a circumferential length corresponding to an angle of circumference of 40 to 70° of the half bearing.

2. The bearing device according to claim 1, wherein the central recessed surface has a circumferential length which is 25 to 75% of the circumferential length of the two support recessed surfaces and the central recessed surface as a whole.

3. The bearing device according to claim 1, wherein the protruding portion end face further comprises a parallel surface between the tilted surface and the support recessed surface, the parallel surface having a constant axial protrusion amount from the axial end face.

4. The bearing device according to claim 1, wherein a bearing wall thickness in the protruding portion of the half bearing is smaller than a bearing wall thickness in the partially cylindrical portion.

5. A bearing device for a radial piston machine, comprising:

a cam ring having a cam face on a radially inner side thereof;

a rotor rotatably supported in the cam ring and having a plurality of cylinders formed radially with respect to a rotational axis of the rotor;

a cylindrical piston arranged slidably in the cylinder;

a cylindrical roller arranged at an axial end of the piston on a cam ring side, a rotational axis of the roller being arranged parallel to the rotational axis of the rotor so that the roller rolls on the cam face; and a half bearing arranged between the piston and the roller, the half bearing being composed of a slide layer forming an inner circumferential surface for supporting the roller and a steel back metal layer forming an outer circumferential surface held by the piston, wherein:

the piston comprises, at the axial end on the cam ring side, a recessed holding surface of partial cylindrical shape for holding the half bearing, and holding side surfaces formed on both axial sides of the recessed holding surface;

each holding side surface comprises:

a ridge portion extending in a radial direction of the recessed holding surface and an axial direction of the piston, and having an arc-shaped or elliptic-arc-shaped profile in a cross section perpendicular to the axial direction of the piston so as to protrude toward a radially inner side of the piston; and side surface portions expanding on both sides of the ridge portion in a circumferential direction of the piston;

the half bearing comprises:

a partially cylindrical portion of partially cylindrical shape circumferentially extending between both circumferential end faces of the half bearing, the partially cylindrical portion having the same axial length as those of the circumferential end faces over the entire circumferential direction of the half bearing, and thereby defining axial end faces on both axial sides thereof that extend in a plane perpendicular to the axial direction of the half bearing; and a protruding portion extending toward an axially outer side from each of the axial end faces of the partially cylindrical portion, and formed over the entire circumferential direction of the half bearing integrally with the partially cylindrical portion;

each of the protruding portions comprises a protruding portion end face facing toward the axially outer side;

the protruding portion end face comprises:

a central recessed surface located at a circumferential center of the half bearing and recessed toward an axially inner side of the half bearing;

two support recessed surfaces located on both circumferential sides of the central recessed surface and each formed into an arc shape or an elliptic arc shape so as to correspond to the profile of the ridge portion; and two tilted surfaces located on both circumferentially outer sides of the two support recessed surfaces and extending up to the circumferential end faces, the two tilted surfaces being formed so that an axial protrusion amount of each of the tilted surfaces from the axial end face becomes smaller from a support recessed surface side toward a circumferential end face side, so that only the two support recessed surfaces of the protruding portion end face are in contact with the ridge portion of the piston while the central recessed surface and the tilted surfaces are not in contact with any of the ridge portion and the side surface portion; and the central recessed surface has a circumferential length which is 25 to 75% of the circumferential length of the two support recessed surfaces and the central recessed surface as a whole.

* * * * *